United States Patent
McGlinchey et al.

(10) Patent No.: US 7,600,199 B2
(45) Date of Patent: Oct. 6, 2009

(54) TASK-BASED INTERFACE WITH UNDERLYING EXTENSIBLE FRAMEWORK

(75) Inventors: Andrew John McGlinchey, Seattle, WA (US); Brett Alan Waldbaum, Sammamish, WA (US); Matthew A. Goldberg, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 663 days.

(21) Appl. No.: 11/110,297

(22) Filed: Apr. 20, 2005

(65) Prior Publication Data

US 2006/0241995 A1    Oct. 26, 2006

(51) Int. Cl.
  *G06F 3/048* (2006.01)
(52) U.S. Cl. .................. 715/853; 715/854; 715/762
(58) Field of Classification Search ............... 715/764, 715/762, 853, 854, 206, 741, 743, 781
  See application file for complete search history.

(56) References Cited

U.S. PATENT DOCUMENTS

| | | | |
|---|---|---|---|
| 6,281,894 B1 * | 8/2001 | Rive | 715/705 |
| 6,671,693 B1 * | 12/2003 | Marpe et al. | 707/102 |
| 7,245,999 B2 * | 7/2007 | Dietsch et al. | 701/50 |
| 7,349,837 B2 * | 3/2008 | Martin et al. | 703/22 |
| 7,467,198 B2 * | 12/2008 | Goodman et al. | 709/223 |
| 7,512,888 B2 * | 3/2009 | Sugino et al. | 715/734 |
| 2002/0080157 A1 * | 6/2002 | Chickles et al. | 345/700 |
| 2002/0149619 A1 | 10/2002 | Sauer | |
| 2004/0122924 A1 * | 6/2004 | Coryell et al. | 709/223 |
| 2006/0242586 A1 * | 10/2006 | McGlinchey et al. | 715/747 |

FOREIGN PATENT DOCUMENTS

WO    WO 99/66394    12/1999
WO    WO 01/44932 A1    6/2001

OTHER PUBLICATIONS

Taking Control of Control Panel. Feb. 14, 2004. Available at http://web.archive.org/web/20040211074509/http://www.coolnerds.com/XP/ControlPanel/xpControlPanel.htm.*
Cowart, Robert. "Special Edition Using Microsoft® Windows® XP Professional". Que. Dec. 4, 2001.*
First Chinese Official Action.
Myers, B.; "User-Interface Tools: Introduction and Survey," IEEE Jan. 1989, pp. 15-23.

* cited by examiner

*Primary Examiner*—Kieu Vu
*Assistant Examiner*—Omar Abdul-Ali
(74) *Attorney, Agent, or Firm*—Westman, Champlin & Kelly, P.A.

(57) ABSTRACT

A computer-implemented method is disclosed. The method is for rendering a display associated with a task-oriented user interface. The method includes receiving a request to display a category view that includes an indication of a plurality of task categories. A system database is referenced to gain access to a collection of information that is indicative as to which of a plurality of tasks are affiliated with a given task category. The plurality of task categories are displayed each in association with one or more affiliated tasks.

15 Claims, 7 Drawing Sheets

TASK-BASED INTERFACE WITH UNDERLYING EXTENSIBLE FRAMEWORK

BACKGROUND OF THE INVENTION

The present invention pertains to user access to means for adjusting settings and configuration alternatives associated with a computing device. More specifically, the present invention pertains to a task-based interface for adjusting settings and configuration alternatives.

Many software programs have a large number of options for adjusting settings and configuration alternatives, and commonly have a large and complicated user interface scheme for allowing a user to make such adjustments. One disadvantage associated with most of these user interfaces is that a user is forced to map from what he'd like to do (for example, "erase the log of what web pages I've visited") to the part of the user interface where the task can be accomplished (e.g., the Network and Internet category, Internet Options applet, General tab, Clear History button).

The control panel component associated with an operating system is a prime example of one environment in which the described challenges arise. There are hundreds of tasks that a user can accomplish with controls implemented through a typical control panel. In many cases, when a user opens the control panel, they are presented with a list of control panel applets and often, especially at first, do not know what they do. The applet names, descriptions, and icons give a general idea, but for the most part users must open an applet and "tinker with it" to discover its functionality.

In some cases, parties other than the original creators of the control panel are able to add functionality of their own, most often in the form of new applets. Typically, a customized extension of the core user interface system is accomplished through specialized code generated by a highly skilled application developer. There is a need for an extensible task framework for simplifying the process of making modifications and additions to a scheme for enabling the adjustment of settings and configuration alternatives.

SUMMARY OF THE INVENTION

Embodiments of the present invention pertain to a computer-implemented method for rendering a display associated with a task-oriented user interface. The method includes receiving a request to display a category view that includes an indication of a plurality of task categories. A system database is referenced to gain access to a collection of information that is indicative as to which of a plurality of tasks are affiliated with a given task category. The plurality of task categories are displayed each in association with one or more affiliated tasks.

DETAILED DESCRIPTION OF ILLUSTRATIVE EMBODIMENTS

I. Exemplary Environment

Figure 1:
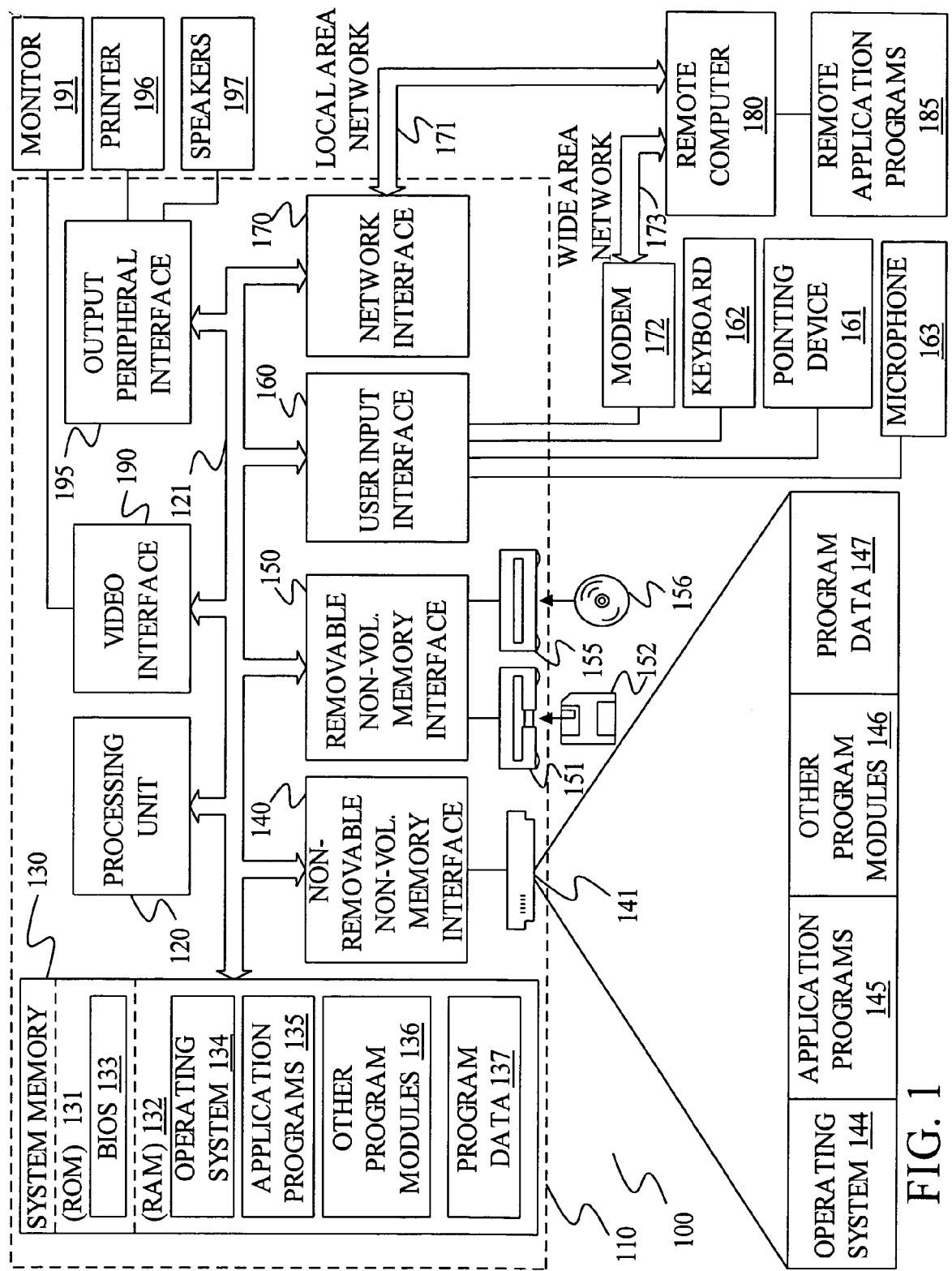
FIG. 1 is a block diagram of one computing environment in which the present invention may be implemented.

FIG. 1 illustrates an example of a suitable computing system environment 100 within which embodiments of the present invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a central processing unit 120, a system memory 130, and a system bus 121 that couples various system components including the system memory to the processing unit 120.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

II. Overview: Task-Based Interface for Adjusting Settings Configuration Alternatives One aspect of the present invention pertains to a task-based interface for facilitating the adjustment of settings and configuration alternatives. The interface generally includes a plurality of selectable tasks presented from the perspective of a user. In one embodiment, the tasks themselves are self-descriptive and provide information about the task itself, like, "make my computer run faster," rather than from an engineering perspective, like "defragment my hard drive".

Another aspect of the present invention pertains to an interface component that enables users to search for particular tasks. In one embodiment, identification of a task can be accomplished even if the words used to search are different than those incorporated into the task itself. For example, a system can be configured to accommodate synonyms such that a search input in the form of "speed up performance" will match "make my computer run faster".

In accordance with one embodiment, a result set provided in response to a search includes matching tasks which, when selected (e.g., clicked on), take the user directly to the part of the interface where the task can be accomplished. In one embodiment, the tasks are arranged in the search results so as to appear related to a corresponding applet that is associated with the task.

In accordance with one aspect of the present invention, the tasks are featured prominently throughout various components of the user interface. For example, the tasks are illustratively incorporated into a display of control panel categories, into a display of various applets under a given category and/or into a display of recently executed tasks. Through prominent incorporation of the tasks, a user is able to easily browse for a desired task. Browsing allows a user who is only vaguely sure what is desired to home in on the right task. The previously described searching allows a user who already knows the nature of a desired task to quickly find the correct user interface component to accomplish the underlying goal.

III. User Interface Components

Figure 2:
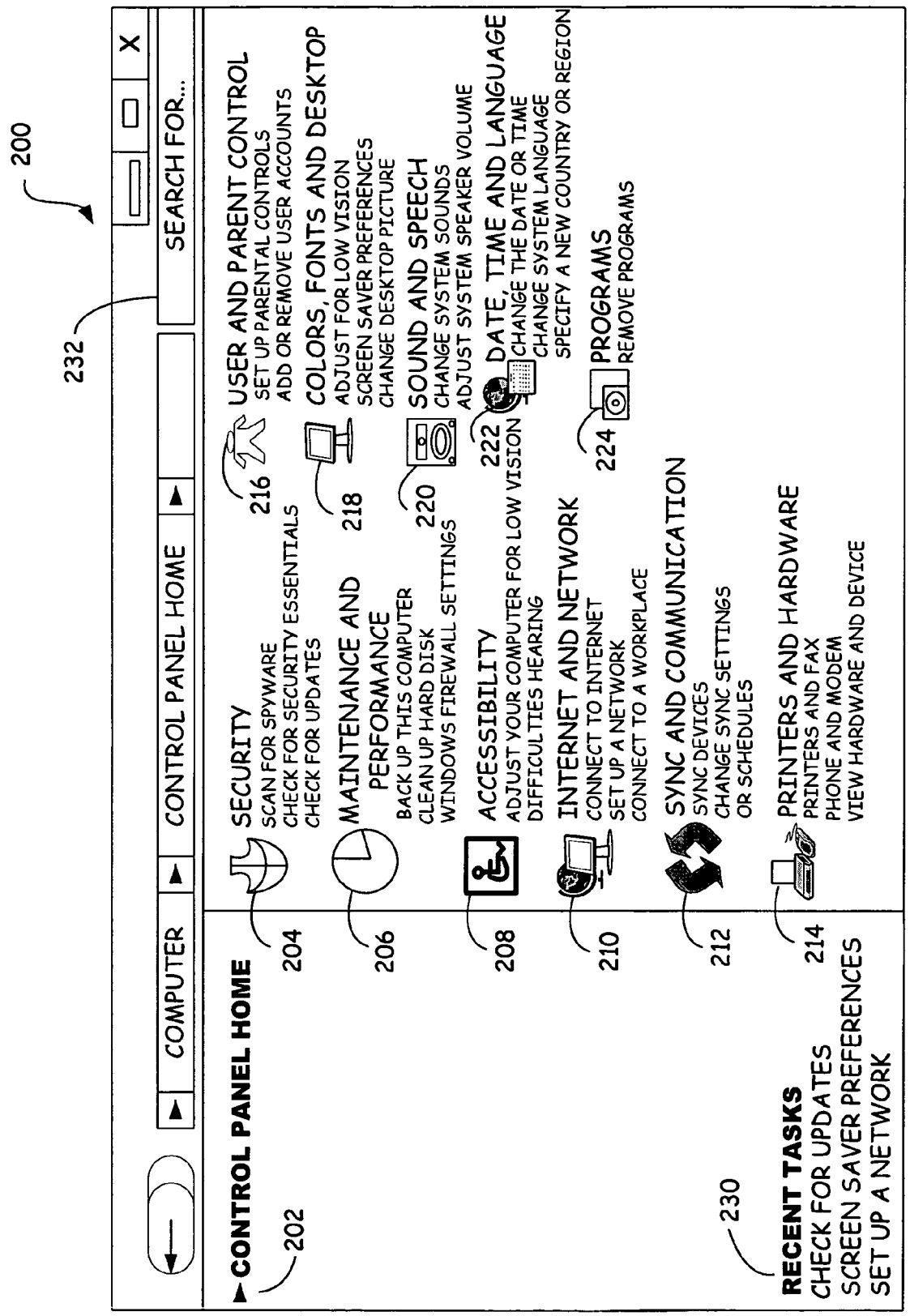
FIG. 2 is an exemplary screenshot representing a control panel home view.

FIG. 2, in accordance with one aspect of the present invention, is a representation of an exemplary screenshot 200. As is indicated at 202, screenshot 200 is a home page associated with a control panel user interface system. While embodiments of the present invention will be described in the context of a control panel interface associated with an operating system, the scope of the present invention is not so limited. The same embodiments could just as easily be applied in the context of any software application that supports an adjustment of settings and/or configuration alternatives.

Screenshot 200 includes a plurality of categories 204-224. Each category includes an icon, and under each category is a listing of corresponding tasks. For example, under the "Maintenance and Performance" category 206, a plurality of corresponding tasks include "Back Up This Computer," "Clean Up Hard Disk," and "Windows Firewall Settings." The tasks under each category provide an informational benefit at least in that they give hints as to the contents of each category. Of course, most categories will actually be associated with a greater number of tasks than those appearing on the control panel home page. Selecting (e.g., clicking) one of the tasks will illustratively cause the display to transition to the part of the interface where that task can be accomplished.

The categories 204-224 are each associated with individual applets that provide an additional user interface through which a user can change related settings and configurations. Selecting (e.g., clicking) one of the categories will illustratively cause the display to transition to a user interface containing the corresponding applets. Again, selecting (e.g., clicking) one of the tasks under a given category will illustratively cause a jump directly to an appropriate and corresponding user interface, for example, a jump directly to the appropriate and corresponding portion of a related applet.

Screenshot 200 also includes a "Recent Tasks" list 230. List 230 includes a plurality of tasks that have been recently selected by the user. Selecting (e.g., clicking) one of the tasks in list 230 will cause a jump directly to an appropriate and corresponding user interface, for example, a jump directly to the appropriate and corresponding portion of a related applet.

Screenshot 200 also includes a searching component 232. A user can illustratively enter search terms into the field associated with component 232. The system is illustratively configured to utilize the entered search terms to identify corresponding tasks. In one embodiment, only the task descriptors themselves are compared to the search terms during the search process. In another embodiment, a set of keywords are associated with a task and compared to the search terms during the search process. In another embodiment, a natural language searching process is supported (e.g., natural language input analyzed to identify corresponding results that may or may not be textually similar). In another embodiment, word breaking is supported. For example, an input "installprinter" would be recognized as the two words "install" and "printer" such that the words are separated prior to execution of a search. This is especially advantageous in the context of languages that do not always require spaces between words. In another embodiment, stemming is supported. For example, if the input "installing" is entered into the search box and there is only a keyword for "install," then an inflection/reduction component would recognize that "installing" has "install" as a stem and eliminate the "ing" ending. This is especially advantageous in the context of languages that have an abundance of inflections.

In one embodiment, applet names and descriptions are compared to the search terms during the search process. In one embodiment, only the exact search terms are compared during the search process. In another embodiment, synonyms associated with the search terms are compared during the search process. Identified corresponding tasks are returned to the user as a set of search results. Selecting (e.g., clicking) a task from the search results will illustratively cause a jump directly to an appropriate and corresponding user interface, for example, a jump directly to the appropriate and corresponding portion of a related applet.

Figure 3:
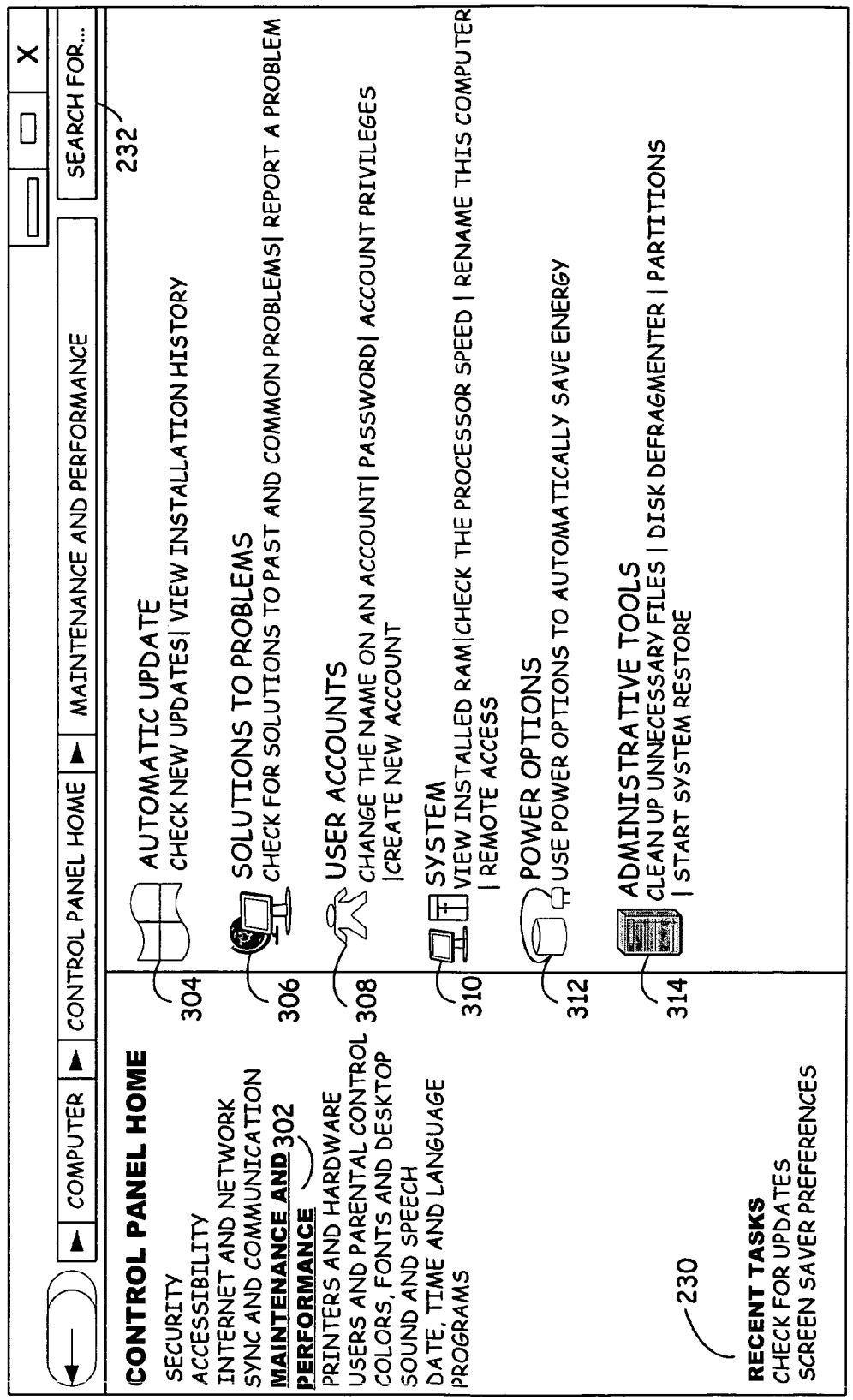
FIGS. 3 and 4 are exemplary screenshots representing control panel applet views.

FIG. 3, in accordance with one aspect of the present invention, is a representation of an exemplary screenshot 300. Screenshot 300 includes, similar to screenshot 200, a "Recent Tasks" access interface 230 and a "Search For" access interface 232.

Screenshot 300 shows the contents of a category upon selection (e.g., the result of drilling down from a selected category). Specifically, as is indicated at 302, screenshot 300 represents the contents of "Sync and Communication" category 212 (FIG. 2). As is reflected in FIG. 3, the contents of each category illustratively include a plurality of applets. The 'Maintenance and Performance' category includes applets 304-314. Beneath each applet are listed some tasks that each applet can accomplish. For example, the 'Automatic Update' applet 304 includes a first task "Check New Updates" and a second task "View Installation History". Selecting (e.g., clicking) one of the tasks will cause a jump directly to an appropriate and corresponding user interface, for example, a jump directly to the appropriate and corresponding portion of the related applet. Some of the tasks listed under the applets may or may not be the same as some of the tasks listed under the corresponding category on the home page component of the control panel user interface system. Each applet may include tasks in addition to those displayed in the applet view.

In accordance with one aspect of the present invention, applets associated with a given category may be provided either by the sponsor of the operating system or by other parties who install their own applets (and related tasks). Thus, in accordance with one aspect of the present invention, the control panel user interface is extensible at least in that new applets can be added and new tasks can be added to new applets. Embodiments of system mechanics for supporting the described system extensibility form part of the present invention and will be described subsequently in the present description.

It should be noted that it is within the scope of the present invention to expand the described system extensibility to encompass an ability to add categories, applets and tasks in any combination. For example, a user can add a new category. Or, a user can add new tasks to existing (e.g., pre-configured) applets. Or, a user can re-align existing (e.g., pre-configured) tasks with a new applet. These are only a few examples. All combinations of manipulation are within the scope of the present invention.

While a full extensibility system supporting all extensibility combinations is within the scope of the present invention, one aspect of the present invention pertains to implementation of restrictions to limit the scope of available options. In accordance with one embodiment, the scope of changes is limited to 1) adding new applets; and 2) adding new tasks to new applets. In one embodiment, in addition to these restrictions, the pre-configured set of categories is limited to the categories supplied by the sponsor of the operating system. Thus, a new applet can be added to an existing category. In one embodiment, to the extent that new tasks can be added, they can be added to a new applet but not an existing applet. When all these limitations are implemented simultaneously, there can be no intrusion upon existing categories, applets and task sets, such as those provided by the sponsor of the operating system. These limitations also prevent outside parties from spamming search results obtained in conjunction with searching interface 232.

Figure 4:
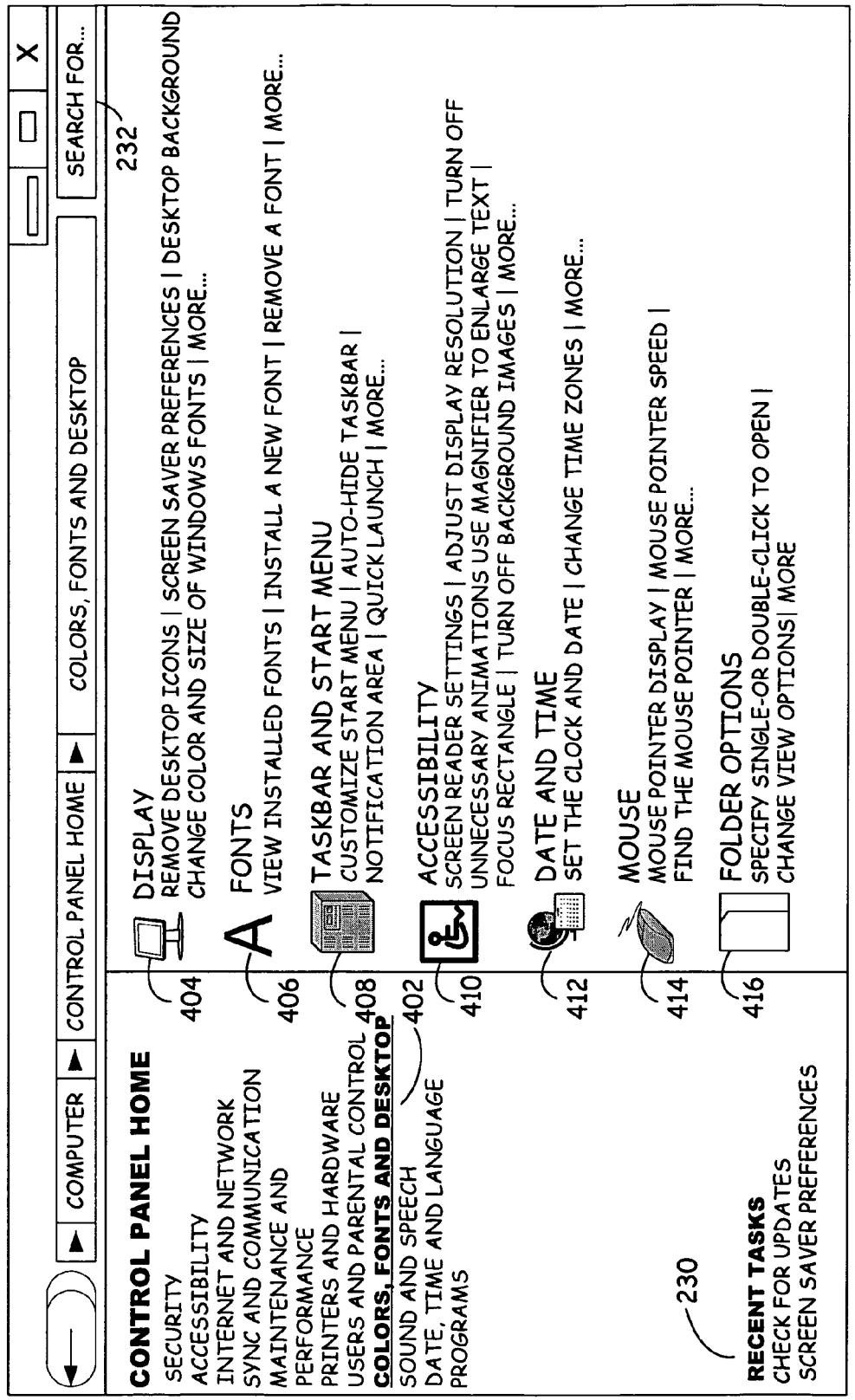

FIG. 4, in accordance with one aspect of the present invention, is a representation of an exemplary screenshot 400. Screenshot 400 includes, similar to screenshot 200, a "Recent Tasks" access interface 230 and a "Search For" access interface 232.

Screenshot 400 provides another example of the contents of a category. Specifically, as is indicated at 402, screenshot 400 represents the contents of "Colors, Fonts and Desktop" category 218 (FIG. 2). As is reflected in FIG. 4, the contents of each category illustratively include a plurality of applets. The 'Colors, Fonts and Desktop' category includes applets 404-416. Beneath each applet are listed a limited set of the tasks that each applet can accomplish. For example, the 'Fonts' applet 406 includes a first task "View Installed Fonts", a second task "Install a New Font" and a third task "Remove a Font". Selecting (e.g., clicking) one of the tasks will cause a jump directly to an appropriate and corresponding user interface, for example, a jump directly to the appropriate and corresponding portion of the related applet. Some of the tasks listed under the applets may or may not be the same as some of the tasks listed under the corresponding category on the home page component of the control panel user interface system.

It is worth now elaborating somewhat upon the description of searching interface 232. Interface 232 has been shown in the context of the control panel home page (FIG. 2) and the pages listing specific applets (FIGS. 3 & 4). However, it is within the scope of the present invention that this searching interface be accessible from any entry point, whether it be inside or outside of the actual control panel system.

Figure 5:
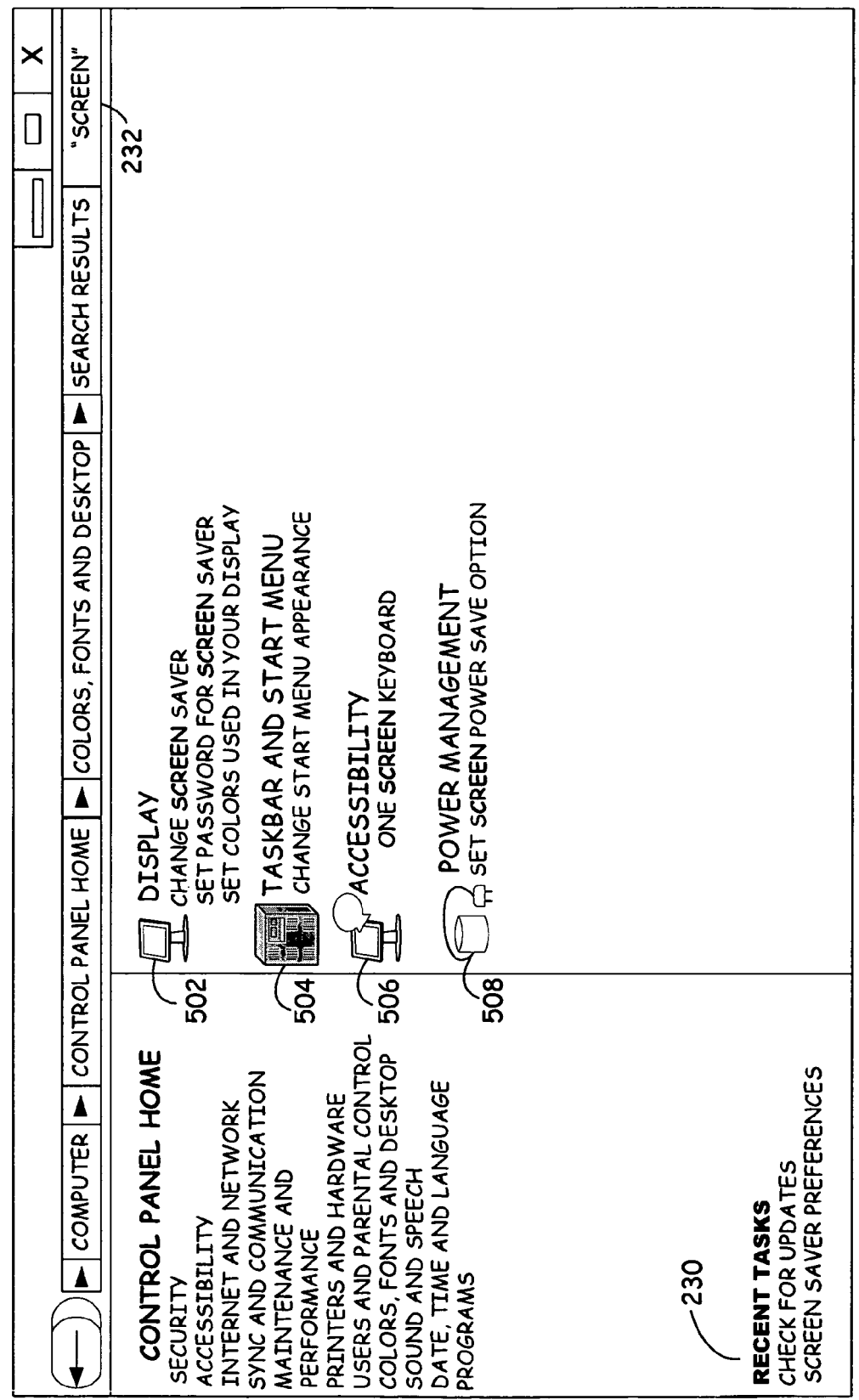
FIG. 5 is an exemplary screenshot representing a task search results view.

FIG. 5, in accordance with one aspect of the present invention, is a representation of an exemplary screenshot 500. Screenshot 500 includes, similar to screenshot 200, a "Recent Tasks" access interface 230 and a "Search For" access interface 232.

Screenshot 500 represents an example of a search results output. In this case, the user has illustratively typed "screen" into the search box and pressed 'enter' to execute a search (in one embodiment, 'enter' is not pressed because a search is conducted automatically as the user types such that results come back instantly, and are updated with each keystroke). The results are returned in the form of a list of matching tasks, grouped hierarchically beneath corresponding applets 502-508. This grouping scheme provides further context for the text of the task and helps to teach the purpose for each applet. As has been described above, the system can be configured to prevent third party applet sponsors (not the sponsor of the operating system) from adding tasks that might mislead a user as to their purpose or the purpose of an original applet. In one embodiment, the search looks through any combination of the text of the tasks, extra keywords associated with the tasks, and the applet names and descriptions.

In one embodiment, as is shown in FIG. 5 in the context of applets 502, 506 and 508, search terms are highlighted within the search results. As is shown in the context of applet 504, some search results may be returned based on a synonym equivalency as opposed to literal equivalency. For example, in the illustrated case, the task "Change Start Menu Appearance" matched with the search term "screen" through means other than a comparison to the text of the task (e.g., keywords).

It is worth now reiterating that embodiments of the present invention pertain to a conjunction of searching and tasks, including the organization of how search results are returned. The described system of showing tasks as related to the applet that completes them enables at least three advantages: 1) it enhances learning, as a user can better learn what tasks can be accomplished with what UI, allowing more direct access to the UI in the future; 2) it provides more information about the kinds of things the applet is useful for, in the event the user needs to perform a task that is not provided; and 3) when third parties extend the control panel with their own applets, they can add searchable tasks of their own, which can appear related to their applets, but cannot 'spam' the task lists of other applets.

IV. Overview: Extensible Task Framework

As has been described, one aspect of the present invention pertains to a control panel user interface that incorporates tasks for displayed categories and most, if not all, applets. A task is a selectable, descriptive link or button that, upon activation, facilitates execution of the action described by the content of the text or image. By providing a task-context for categories and applets, users can discover what an applet does and quickly execute a task.

In one embodiment of the present invention, tasks can be added to applets through a framework that uses a registration system (e.g., the registry system associated with the operating system) and descriptive metadata information (e.g., information implemented in XML file format). One benefit associated with an extensible framework is that third party applet developers (i.e., developers not associated with the sponsor of the operating system) can author and implement tasks. Thus, the user interface system is not required to be a closed system limited exclusively to tasks associated with applets shipping with the operating system.

The incorporation of descriptive task metadata that is not in compiled code enables the benefit of allowing non-programmers to author tasks (for example, they can add tasks by editing an XML file without compiling any code). In one embodiment of the present invention, the metadata contains search keywords and/or query phrases that serve as synonyms to be searched against search terms, such as when searching for control panel functionality through the described searching interface 232. In another embodiment, the described framework is built for backwards-compatibility such that applets do not need to be recompiled in order to present tasks in the category view (i.e., the view shown in FIG. 2). In yet another embodiment, a tool, such as a graphical, visual editor, is provided to assist task authors in the generation of task metadata information within the described framework.

V. Extensible Task Framework Components

Figure 6:
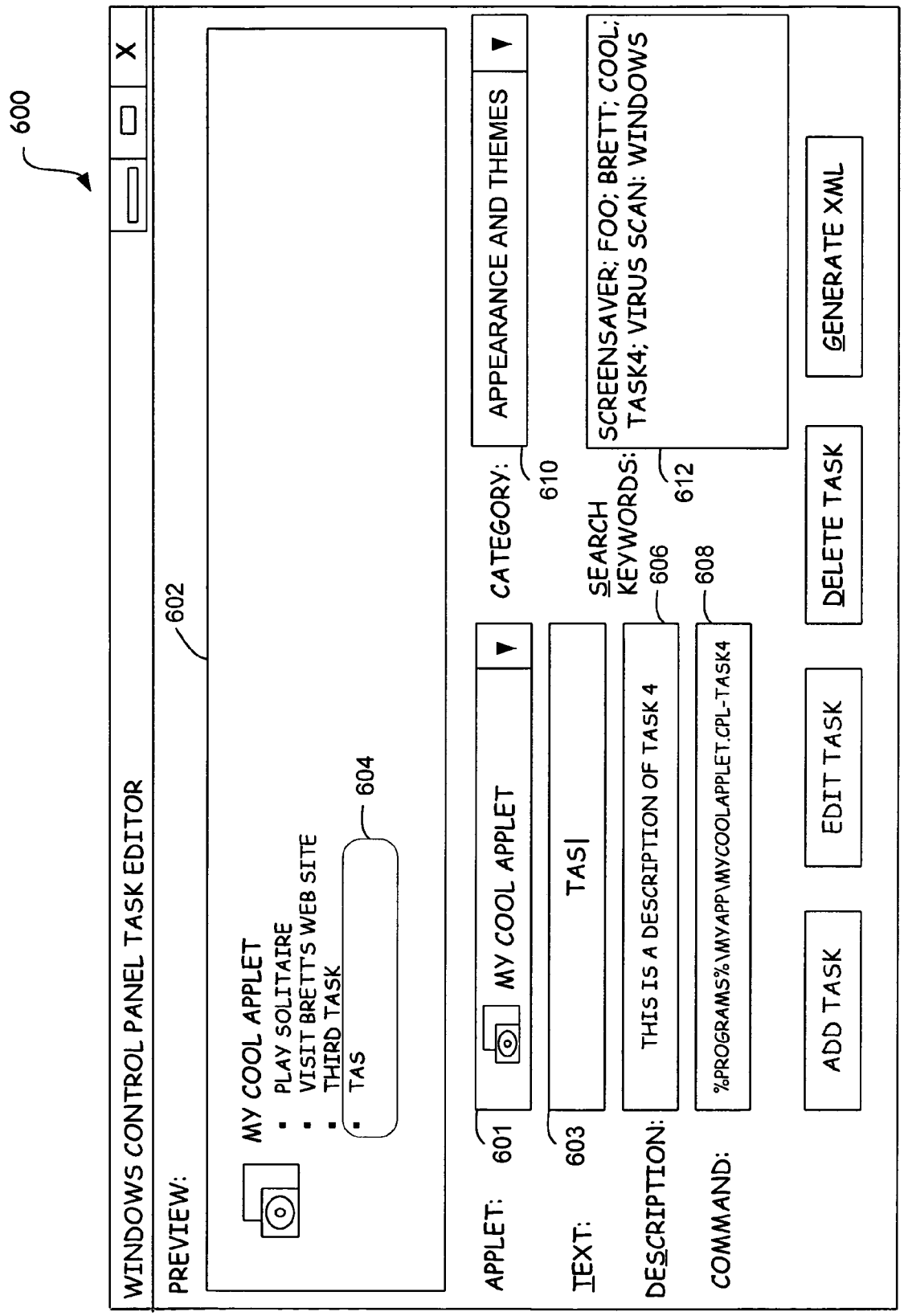
FIG. 6 is an exemplary screenshot representing a tool for facilitating creation of a task.

FIG. 6, in accordance with one aspect of the present invention, is a representation of an exemplary screenshot 600. Screenshot 600 is one example of a user interface associated with a tool provided to support task authors in the creation of a new task. In one embodiment, by filling out various fields associated with the visual representation of the tool, an author creates a specialized collection of task metadata, thereby enabling support for a new task.

Screenshot 600 includes an applet selection field 601. In this field, the author selects an applet to which the new task will be added. As has been described, in one embodiment, the user is limited to adding tasks only to new (i.e., not pre-configured) applets. Once an applet has been selected, the display of that applet, including a set of associated tasks, appears in a preview window 602. In one embodiment, the author is provided with means for determining which (if not all) tasks are displayed in the context of the corresponding applet.

In the illustrated case, the author has manipulated field 601 to select the "My Cool Applet" applet, which is then displayed in preview window 602. In field 603, the author enters the text of a new task to be created and added to the selected applet. In the illustrated case, the author has so far entered the text "TAS". As is illustrated by field 604, as text for the new task is entered, it appears in preview window 602.

A description of the new task is entered into field 606. Depending on how the system is configured, the terms entered into field 606 will be compared during a search process, such as when a user searches for tasks through searching interface 232. In field 612 are entered keywords to be included in the searching process. In field 608 is entered a location corresponding to the source of functionality associated with the new task. As is indicated by field 610, the author is able to designate a category to which the applet designated in 601 should be assigned. When an applet is first selected, its current category will appear in field 610 but can be changed based on the author's preferences. As has been described, in one embodiment, each applet must be assigned to one of the pre-configured categories (i.e., there is a restriction against creation of a new category). In accordance with one embodiment, the tool enables the author to create new applets, each of which is assigned to a pre-configured category, and is assigned tasks as the author desires.

As is indicated by the four buttons at the bottom of screenshot 600, the author is able to use the tool to add tasks, edit an existing task (illustratively restricted to new, not pre-configured tasks) or generate XML. Generating XML enables the author to generate the descriptive task metadata that supports creation of a task as indicated. A purpose and function of such metadata will become apparent following the description of FIG. 7 below.

Figure 7:
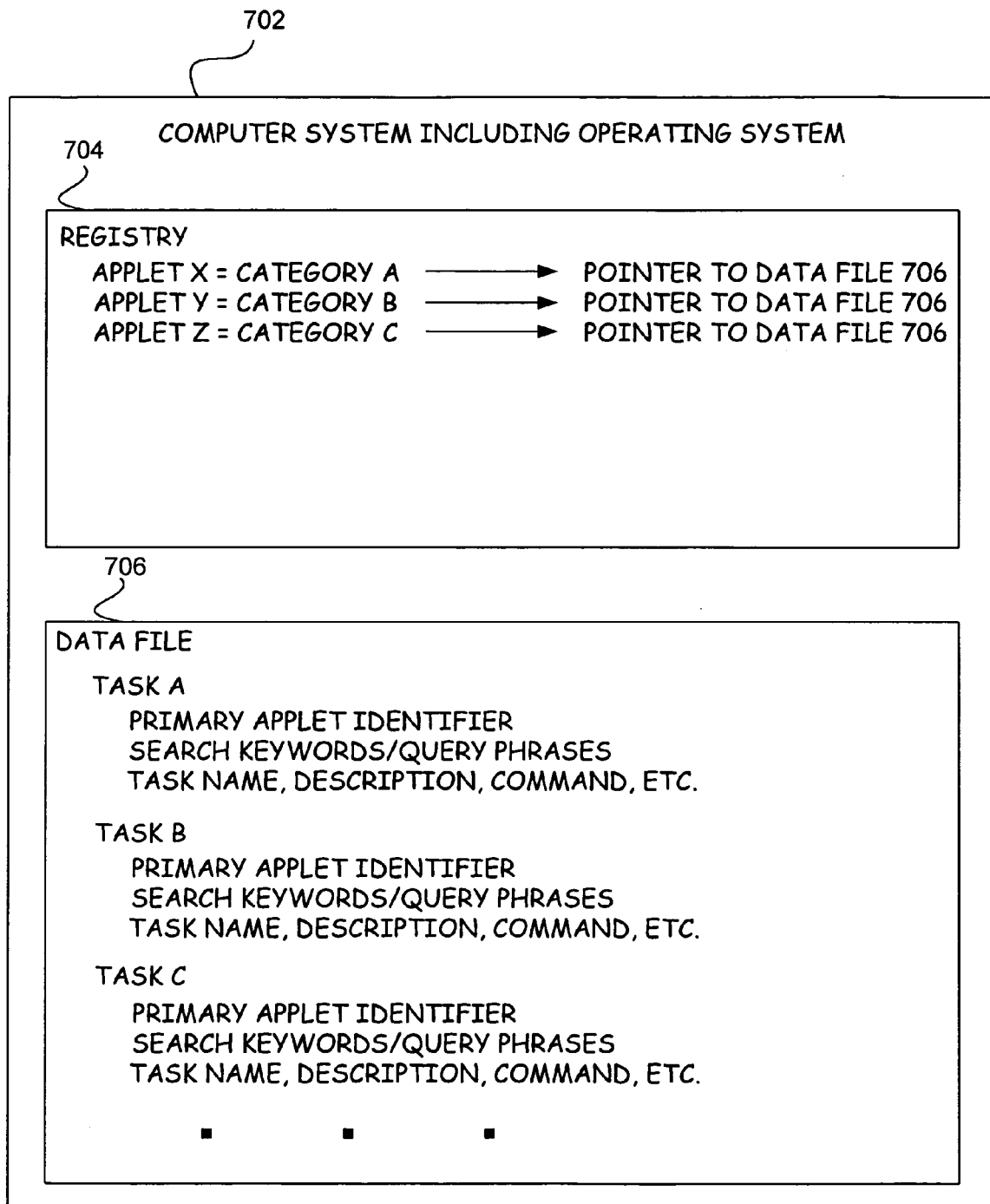
FIG. 7 is a schematic diagram demonstrating a data management scheme.

FIG. 7, in accordance with one embodiment of the present invention, is a schematic diagram demonstrating a data management scheme for supporting the described embodiments of a control panel extensible task framework. A computer system 702 illustratively includes an operating system. The operating system illustratively includes a registry 704. The computer system also includes a data file (e.g., an XML file) 706.

In accordance with one aspect of the present invention, when a request for the control panel category view (i.e., FIG. 2) is received, display information is retrieved and processed for each category. In addition, applets that correspond to each category are enumerated using the operating system registry and file system.

As is shown in FIG. 7, applets are aligned in the registry with corresponding categories. To simplify the Figure, only a few applets (X, Y and Z) have been included in the illustration. For each applet, there is a registry entry that points to a data file (e.g., an XML file) that is parsed to extract the corresponding applets tasks. FIG. 7 shows applets x, y and z pointing to a data file 706, which contains a directory of tasks with identifiers to link them to one or more applets (for simplification, only three tasks are illustrated in data file 706). It should be noted that it is within the scope of the present invention that the data file be instead implemented from within the file system of the operating system or as an embedded resource. All similar or equivalent implementations are also within the scope of the present invention.

As will be recognized by those skilled in the art, the specific configuration illustrated in FIG. 7 is only one of many ways to implement the described functionality. All similar variations are to be considered within the scope of the present invention. While FIG. 7 would seem to imply that an applet must register a category before pointing to a data file, this is not necessarily the case. In accordance with one embodiment, an applet is configured to register these two pieces of data independently.

In accordance with one aspect of the present invention, for each task, the metadata in file 706 will include any of a display name (optionally localized into multiple languages), a descriptive tool tip (optionally localized), a command to run when the task is invoked, optional states to check before displaying the task, task name, and task description or some other information. Other descriptive metadata, such as keywords or related search queries, are also potentially included to enable the tasks to be exposed in task search results. An example of a state check is to not show an "Add New User" task if the current user is not an Administrator on the computer. In one embodiment, there is additional metadata that determines which tasks appear when an applet appears under different categories, as well as the order in which tasks appear. In one embodiment, task names and descriptions can be overridden when appearing under specified categories.

As has been described, one aspect of the present invention pertains to a tool provided to support an author in making the registry and/or data file entries necessary to manipulate the extensible framework. In one embodiment, as was alluded to in FIG. 6, a visual editor is configured to abstract the underlying data management schema for task authors by enabling them to information such as, but not necessarily limited to, a task name, a description, and a command. This saves the author the trouble of direct editing, such as direct editing of an XML file. The tool also illustratively supports a simplified ability (i.e., without direct coding) to specify task state checks. The tool also illustratively supports a simplified ability to specify which tasks appear under which applets for each category, as well as an ability to override task names and descriptions. As has been described, one embodiment pertains to the provision of a virtual screenshot demonstrating what the applet will look like with its list of tasks. Such a screenshot can be drawn so the user doesn't need to actually load the task in the control panel to see what is being edited.

In accordance with another embodiment, the described data management scheme includes an internal data file (e.g., an XML file) (not illustrated in FIG. 7) that references tasks that should appear under each category in the category view home page (e.g., FIG. 2). A similar file can be implemented to determine tasks displayed in the applet views (e.g., FIGS. 3 & 4). As categories or applets are added, their associated tasks can be designated as selectable hyperlinks. Those skilled in the art will appreciate that there are many obvious means for implementing a system to police or restrict which tasks are or are not displayed in various views or windows.

It should be noted that the embodiments of data management associated with the present invention are not limited to a registry system associated with an operating system. Other registry systems can be similarly implemented without departing from the scope of the present invention. Similarly, the embodiments of data management are not limited to implementation of any particular data file system. For example, any data file other than XML data files can be similarly implemented without departing from the scope of the present invention. Also, without departing from the scope of the present invention, the line between the functionality of the registry system and the functionality of the data file can be manipulated. For example, elements tracked in the data file can alternatively be tracked in the registry, and vice versa.

In summary, embodiments of the present invention pertain to a system that enables users to more quickly jump to the area of a control panel applet's user interface that relates to the desired task. Task buttons in the control panel category view are illustratively associated with metadata to support the task shortcut. Instead of requiring users to open an applet then search its windows or tabs for the task they intend to complete, they can simply click a task button that enables a jump straight to an appropriate applet component for performing the task. In one embodiment, the jump is straight to an active content wizard or guided help component that provides guidance for completing the task.

Other embodiments of the present invention pertain to an underlying XML file metadata schema and registration system that supports applet developers in the addition and manipulation of tasks. Through this schema, developers are not forced to write compiled code modules to enable their applets to show tasks in a category view; instead, a data file contains the task metadata. In one embodiment, a tool (e.g., a graphical, visual editor) is provided to support applet developers. In one embodiment, the tool enables applet developers to author tasks in a manner that is far easier than utilization of a text editor.

Although the present invention has been described with reference to particular embodiments, workers skilled in the art will recognize that changes may be made in form and detail without departing from the spirit and scope of the invention.

What is claimed is:

1. A system for supporting the rendering of a display associated with a control panel user interface, comprising:
   a computer processor that is a functional component of a computer;
   a data file containing a plurality of entries, wherein each entry in the data file identifies a task, and wherein each task corresponds to a computing device setting;
   a system database containing a plurality of entries, wherein each entry in the system database affiliates an applet to a task category;
   at least one pointer that links the data file to the system database so as to support a parsing of the data file by the computer processor that is a functional component of a computer, wherein said parsing includes a determination of which tasks represented by the plurality of entries in the data file are affiliated with which applets represented by the plurality of entries in the system database;
   an authoring tool that enables a developer to add information to the data file so as to add a new entry indicative of a new task, and wherein the authoring tool also enables the developer to associate the new task with a first particular applet represented by an entry in the system database such that the new task is identified as being affiliated to the first particular applet as part of said determination, and wherein the authoring tool prohibits the developer from associating the new task with at least a second particular applet represented by an entry in the system database such that the new task is prohibited from being identified as being affiliated to the second particular applet as part of said determination; and
   wherein at least one of said plurality of entries in the data file includes an indication of a command to run when a corresponding task is invoked.

2. The system of claim 1, wherein the system database is implemented as part of a software component configured to store hardware and software configuration data used to facilitate operation of an operating system.

3. The system of claim 1, wherein the system database is implemented as part of a registry associated with an operating system.

4. The system of claim 1, wherein the data file is implemented as an XML file.

5. The system of claim 1, wherein each entry in the data file includes a parameter related to the corresponding identified task, wherein the parameter is an informational element selected from a group consisting of a display name, a descriptive tool tip, an indication of a command to run when the task is invoked, and a state to check before displaying the task.

6. The system of claim 1, wherein at least one entry in the data file includes a listing of search keywords or key phrases, and wherein the authorizing tool enables the developer to add words to the listing of search keywords or key phrases.

7. The system of claim 1, wherein the control panel user interface is a computing device operating system control panel interface.

8. The system of claim 1, wherein each entry in the data file includes information as to what should occur when the corresponding function is selected by a user.

9. The system of claim 1, further comprising a single graphical user interface rendered on an output device of computer, wherein the single graphical user interface includes a visible indication of a selectable task category for each of the plurality of applets represented in the system database, and wherein the single graphical user interface also includes, for each of the selectable task categories, at least one proximately rendered selectable task category, and wherein a determination of which selectable task goes with which selectable task categories is made by a rendering component based at least in part on information in the data file and the system database.

10. The system of claim 1, wherein the authoring tool is configured to prohibit the developer from making changes other than 1) creation of a customized applets; and 2) adding the new task to the customized applet.

11. The system of claim 1, wherein the authoring tool is configured to enable the developer to manipulate the data file and/or the system database so as to create, delete or edit a task or applet.

12. A system for supporting the rendering of a display associated with a control panel user interface, comprising:
   a computer processor that is a functional component of a computer;
   a data file containing a plurality of entries, wherein each entry in the data file identifies a task;
   a system database containing a plurality of entries, wherein each entry in the system database identifies a category;
   at least one pointer for linking the data file to the system database so as to support a parsing of the data file to determine which tasks represented by entries in the data file are affiliated with which categories represented by entries in the system database; and
   an authoring tool that enables a developer to add information to the data file so as to add a new entry indicative of a new task, and wherein the authoring tool also enables the developer to identify a first particular category as being affiliated with the new task, wherein said adding the new entry and identifying the first particular category causes the new task to subsequently be rendered within a portion of control panel user interface as a selectable choice under a visually rendered indication of the first particular category, and wherein said portion of the control panel user interface also includes a simultaneously visually rendered indication of a second particular category, wherein each of the first and second particular categories is represented by a corresponding entry in the system database and wherein indications of each of the first and second categories are rendered together along with an indication of a selectable task for each of the first and second categories;

wherein the authoring tool prohibits the user from identifying the second particular category as being affiliated with the new task.

13. The system of claim 12, wherein the data file includes descriptive metadata information that is not in compiled code.

14. The system of claim 1, wherein prohibiting the developer from associating the new task with a second particular applet comprises enforcing a system policy that restricts the developer from adding the new task to an applet that is a standard, non-customized component of a control panel portion of a software operating system.

15. The system of claim 12, wherein prohibiting the developer from identifying the second particular category as being affiliated with the new task comprises enforcing a system policy that restricts adding a newly created task to an applet that is a standard, non-customized component of a control panel portion of a software operating system.

* * * * *